April 21, 1931.                  B. C. BERRY                    1,801,653
                                CORN SERVER
                             Filed Nov. 8, 1929
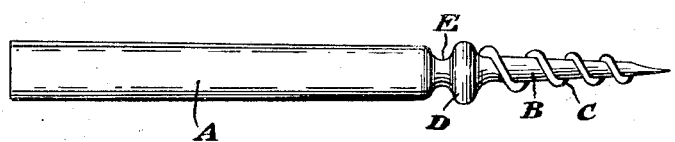
Inventor
Bert C. Berry.
Samuel W. Banning
      Atty.

Patented Apr. 21, 1931

1,801,653

UNITED STATES PATENT OFFICE

BERT C. BERRY, OF MOLINE, ILLINOIS

CORN SERVER

Application filed November 8, 1929. Serial No. 405,571.

This invention relates to improvements in corn servers.

The device of the present invention is intended for the purpose of impaling and firmly supporting an ear of corn to enable the same to be eaten without contact with the fingers.

The object of the invention is to so construct the device that it may be easily inserted into the butt end of the cob to a predetermined distance, and when so inserted will afford adequate support from one end only of the cob to prevent movement.

The device is further designed in such a way as to present an attractive appearance as an article of tableware, without detracting from its utilitarian functions.

Further objects and details will appear from a description of the invention in conjunction with the accompanying drawing, which represents the side elevation of the device, with an ear of corn represented in dotted lines.

The device comprises an elongated cylindrical handle A of a size and shape to be conveniently and firmly grasped by the hand of the user, from one end of which extends a tapered spike B provided with a steeply pitched heavy thread C. The base end of the thread terminates and merges into a circumferentially extending rounded flange D which is separated from the handle by a channel E.

In use, the end of the spike is thrust into the center of the butt end of the cob of an ear of corn, and the server is then rotated until it is screwed into the cob to bring the flange D into tightly abutting relation to the end of the cob. By reason of the tapering formation of the spike, in conjunction with the steeply pitched threads, the spike will become tightly wedged into the body of the cob as it is screwed home, so that the close impingement of the threaded spike, together with the contact of the flange, affords a firm and rigid connection which prevents sagging or endwise displacement of the cob and enables the kernels of corn to be eaten from the cob while supported solely from one end and without direct contact with the fingers.

The provision of the groove or channel E, between the handle and the flange, serves to space the butt end of the cob a slight distance away from the end of the handle so as to prevent contact of the hand and also prevent juice or liquid from readily flowing back onto the handle, and at the same time the provision of this groove in conjunction with the rib affords a pleasing line of demarcation between the handle and the spike and renders the device attractive as an article of tableware.

Although the device as shown is made integrally from a single piece of metal, it is obvious that the handle portion might be made separately of any suitable non-metallic substance ordinarily used for knife handles or other articles of tableware.

I claim:

1. A corn server comprising an elongated handle provided at one end with a tapered conical spike having a thread running along the spike, and having an outstanding circumferential flange formed at the base of the thread, and having a groove formed between said flange and the handle.

2. A corn server comprising a handle having projecting therefrom a spike terminating in a point and having a steeply pitched outstanding thread running around the spike and terminating behind the point thereof.

3. A corn server comprising a handle having projecting therefrom a progressively tapering spike terminating in a point and having a steeply pitched outstanding thread running around the spike.

In witness that I claim the foregoing I have hereunto subscribed my name this 5th day of November, 1929.

BERT C. BERRY.